United States Patent
Furman et al.

(10) Patent No.: US 9,720,950 B2
(45) Date of Patent: *Aug. 1, 2017

(54) VERIFICATION OF RECORD BASED SYSTEMS

(71) Applicant: International Business Machines Corporation, Armonk, NY (US)

(72) Inventors: Deborah A. Furman, Staatsburg, NY (US); Anthony T. Sofia, Highland, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/739,321

(22) Filed: Jun. 15, 2015

(65) Prior Publication Data

US 2016/0364431 A1    Dec. 15, 2016

(51) Int. Cl.
    G06F 17/30        (2006.01)

(52) U.S. Cl.
    CPC ...... *G06F 17/30365* (2013.01); *G06F 17/303* (2013.01); *G06F 17/30371* (2013.01); *G06F 17/30867* (2013.01)

(58) Field of Classification Search
    None
    See application file for complete search history.

(56) References Cited

U.S. PATENT DOCUMENTS

| | | | |
|---|---|---|---|
| 6,009,475 A * | 12/1999 | Shrader | H04L 63/0263 709/217 |
| 8,060,812 B2 | 11/2011 | Branda et al. | |
| 8,122,316 B2 | 2/2012 | Noumi et al. | |
| 9,471,621 B1 | 10/2016 | Furman et al. | |
| 2003/0005384 A1 | 1/2003 | Itakura | |
| 2005/0138046 A1 | 6/2005 | Miettinen et al. | |
| 2005/0234823 A1 | 10/2005 | Schimpf | |
| 2006/0156269 A1 * | 7/2006 | Hoffman, Jr. | G06F 17/5022 716/106 |
| 2008/0282105 A1 * | 11/2008 | Deenadhayalan | G06F 11/1076 714/6.12 |
| 2009/0077314 A1 | 3/2009 | Marwood, Jr. et al. | |

(Continued)

OTHER PUBLICATIONS

List of IBM Patents or Patent Applications Treated As Related (Appendix P), filed herewith, 2 pages.

(Continued)

*Primary Examiner* — Alex Gofman
*Assistant Examiner* — Umar Mian
(74) *Attorney, Agent, or Firm* — Christopher McLane; Daniel R. Simek (57) ABSTRACT

The method includes generating, by one or more computer processors, a first piece of data based on a defined set of data characteristics. The method further includes generating a first bit, wherein the first bit corresponds to the first generated piece of data. The method further includes sending the first generated piece of data to a target location. The method further includes receiving the first generated piece of data from the target location. The method further includes determining whether to validate the first generated piece of data received from the target location. The method further includes adjusting the first generated bit based on the determination of whether to validate the first generated piece of data.

16 Claims, 3 Drawing Sheets

(56) References Cited

U.S. PATENT DOCUMENTS

2009/0094272 A1* 4/2009 Skriletz .................... G06F 8/10
2009/0164526 A1 6/2009 Hayashi

OTHER PUBLICATIONS

U.S. Appl. No. 14/978,004, filed Dec. 22, 2015.
Chung, et al., "A Study of Data Manipulation Algorithms in Magnetic Bubble Memories", An IP.com Prior Art Database Technical Disclosure, Original Publication Date: Dec. 31, 1979, IP.com No. 000151437, IP.com Electronic Publication: Apr. 22, 2007, 148 pages, Database entry Copyright (c) Software Patent Institute.
"Coordinated error reporting across multiple components using self-describing (XML) document", An IP.com Prior Art Database Technical Disclosure, IP.com No. 000233569, 3 pages, IP.com Electronic Publication: Dec. 15, 2013.
Furman et al., "Verification of Record Based Systems", U.S. Appl. No. 15/255,231, filed Sep. 2, 2016, 22 pages.
Appendix P, List of IBM Patents or Patent Applications Treated As Related, 2 pages, dated Sep. 6, 2016.

* cited by examiner

VERIFICATION OF RECORD BASED SYSTEMS

BACKGROUND

The present invention relates generally to manipulation of data, and more particularly to verifying manipulated data.

Data verification is a process where different types of data are checked for accuracy and inconsistencies after data migration is done. Determining whether data was accurately translated when data is transferred from one source to another, is complete, and supports processes in the new system is beneficial as data may change during a manipulation. In some examples, during verification a parallel run of both systems is performed to identify areas of disparity and forestall erroneous data loss. A type of data verification is double entry and proofreading data. Proofreading data involves someone checking the data entered against the original document.

SUMMARY

Embodiments of the present invention disclose a method, computer program product, and system for verifying data. In one embodiment, in accordance with the present invention, the computer-implemented method includes generating, by one or more computer processors, a first piece of data based on a defined set of data characteristics. The method further includes generating, by one or more computer processors, a first bit, wherein the first bit corresponds to the first generated piece of data. The method further includes sending, by one or more computer processors, the first generated piece of data to a target location. The method further includes receiving, by one or more computer processors, the first generated piece of data from the target location. The method further includes determining, by one or more computer processors, whether to validate the first generated piece of data received from the target location. The method further includes adjusting, by one or more computer processors, the first generated bit based on the determination of whether to validate the first generated piece of data.

DETAILED DESCRIPTION

Embodiments of the present invention recognize that verification of data may utilize large amounts of memory. Embodiments of the present invention recognize that storing data before and after testing a record processing program to verify that the data has been properly processed utilizes valuable resources, such as memory and energy, which can limit the ability to perform verbose testing.

Implementation of embodiments of the invention may take a variety of forms, and exemplary implementation details are discussed subsequently with reference to the Figures.

Figure 1:
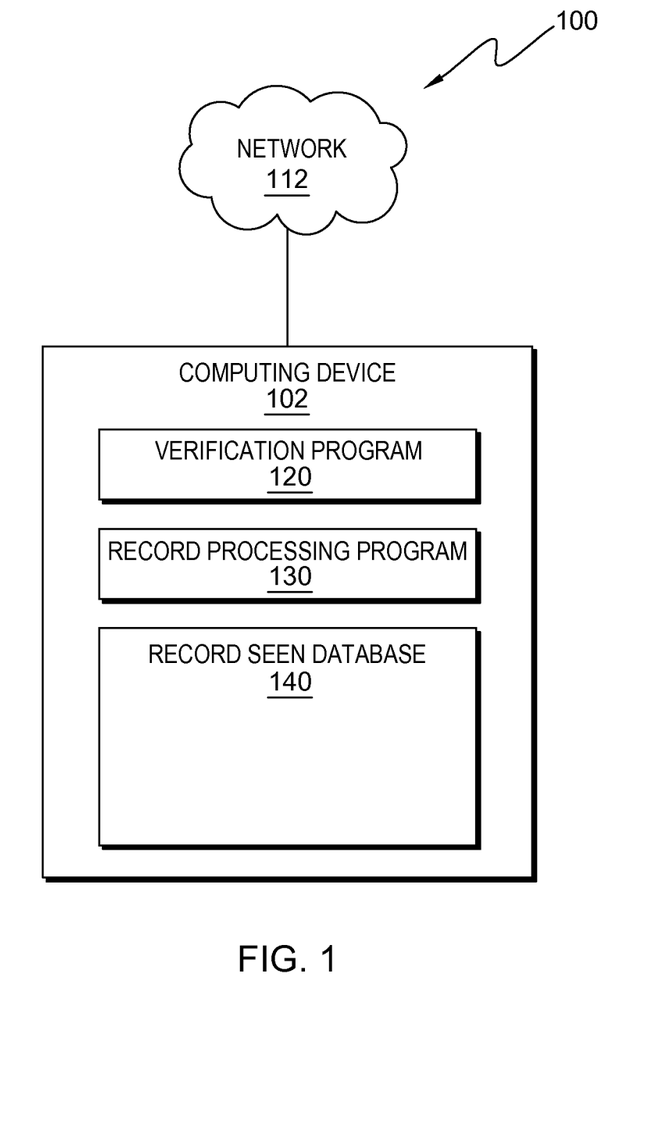
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes computing device 102 connected to network 112. Network 112 represents, for example, a telecommunications network, a local area network (LAN), a wide area network (WAN), such as the Internet, or a combination of the three, and includes wired, wireless, and/or fiber optic connections. Network 112 includes one or more wired and/or wireless networks that are capable of receiving and transmitting data, voice, and/or video signals, including multimedia signals that include voice, data, and video information.

In the depicted environment, computing device 102 is one or more of a management server, a web server, or any other electronic device or computing system capable of receiving, analyzing, and sending data. In other embodiments, computing device 102 represents a server computing system utilizing multiple computers as a server system, such as in a cloud computing environment. In another embodiment, computing device 102 represents a laptop computer, a tablet computer, a netbook computer, a personal computer (PC), a desktop computer, a personal digital assistant (PDA), a smart phone, or any programmable electronic device capable of communicating with network 112. In another embodiment, computing device 102 represents a computing system utilizing clustered computers and components to act as a single pool of seamless resources. Computing device 102 may include components, as depicted and described in further detail with respect to FIG. 3, in accordance with embodiments of the present invention. Computing device 102 includes verification program 120, record processing program 130, and record seen database 140.

In depicted distributed data processing environment 100, verification program 120 resides on computing device 102. Verification program 120 generates data, sends data to a record processing program, receives data manipulated by the record processing program, and verifies the manipulated data from the record processing program. In various embodiments, verification program 120 generates data based upon preset rules or guidelines that are used to test a record processing program (e.g., record processing program 130) for errors. The generated data is sent to a record processing program (e.g., record processing program 130) that manipulates the data in some way. Verification program 120 then receives the manipulated data from the record processing program, and verification program 120 verifies that the data has been correctly manipulated. In some embodiments, verification program 120 may reside on the same computing device as a record processing program (e.g., record processing program 130). In other embodiments, verification program 120 may reside on a separate computing device than the record processing program, and verification program 120 sends and receives data via a network (e.g., network 112)

In various embodiments, verification program 120 may include multiple subprograms, such as a subprogram for generating data based on preset rules to test a record processing program. In another example of a subprogram, verification program 120 may include a subprogram for verification of records received from a record processing program. In yet another example, verification program 120 may include a subprogram for generating virtual storage for storing bits corresponding to data generated and verified (e.g., record seen database 140). Verification program 120 is depicted and described in further detail with respect to FIG. 2.

In depicted distributed data processing environment 100, record processing program 130 resides on computing device 102. In some embodiments, record processing program 130 is a program for sorting or filtering data in a predefined manner. In an example, a user creates a sort or filter program (e.g., record processing program 130). In various embodiments, record processing program 130 receives data from verification program 120, modifies the data based on preset rules (e.g., sort or filter the data), and sends the modified data back to verification program 120. In various examples, record processing program 130 may be a newly created record processing program which has not been fully tested. In an example, a creator of record processing program 130 may want to determine if record processing program 130 is functioning properly; and therefore, utilizes verification program 120 to determine if record processing program 130 is functioning properly. In the example, a user has a block of data to be modified by record processing program 130 in a specific manner, such as filter the data, and verification program 120 verifies that record processing program modified the data correctly.

In the depicted embodiment, record seen database 140 resides on computing device 102. In another embodiment, record seen database 140 may reside elsewhere in distributed data processing environment 100, such as within another computing device (not depicted) or independently as a standalone database that is capable of communicating with computing device 102 via network 112. A database is an organized collection of data. Record seen database 140 is implemented with any type of storage device capable of storing data that is accessed and utilized by computing device 102, such as a database server, a hard disk drive, or a flash memory. In other embodiments, record seen database 140 represents multiple storage devices within computing device 102.

In some embodiments, record seen database 140 may be virtual memory. In an example, virtual memory is a memory management technique that is implemented using both hardware and software. The virtual memory maps memory addresses used by a program, called virtual addresses, into physical addresses in computer memory. In some embodiments, software within an operating system may extend capabilities to provide a virtual address space that can exceed the capacity of real memory and thus reference more memory than is physically present in a computer.

In some embodiments, record seen database 140 may contain bits that represent data (e.g., individual records created by verification program 120 and manipulated by record processing program 130) which are turned on based upon verification of received properly manipulated data from record processing program 130. In various embodiments, a single megabyte of virtual storage contains 8388608 bits and can represent as many records. In an example, if the records generated are 512 bytes each, then a single megabyte can represent 4 gigabytes of records. In various embodiments, record seen database 140 may be a contiguous virtual storage or a second level lookup can be performed to have discontinuous virtual memory areas.

In some embodiments, verification program 120 may create record seen database 140 based upon the amount of data to be generated and sent to record processing program 130. For example, if verification program 120 creates record seen database 140 based upon the number of records generated, wherein the number of records generated correlates to the number of bits in the record seen database.

Figure 2:
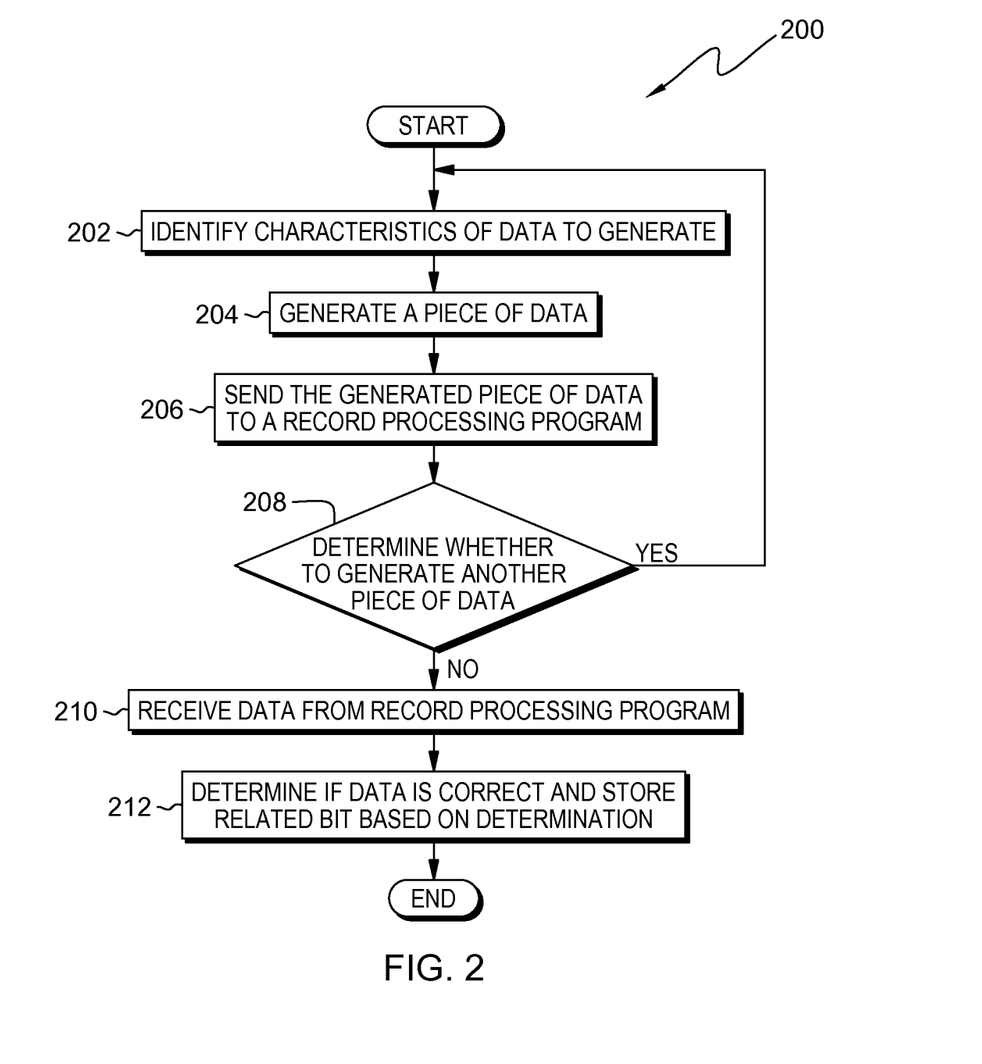
FIG. 2 is a flowchart depicting operational steps of a program for verifying output data from a record based system within the distributed data processing environment of FIG. 1, in accordance with an embodiment of the present invention.

FIG. 2 is a flowchart depicting operational steps of program 200, which is a function of verification program 120, in accordance with an embodiment of the present invention. Program 200 operates on computing device 102 and verifies output data from a record based system. In various embodiments, program 200 may initiate when a user of verification program 120 prompts verification program 120 to begin generating data. In another embodiment, a client device (not depicted) may log into an account of verification program 120, which initiates the operational steps of program 200. In an embodiment, verification program 120 may begin operational steps of program 200 at preset times or preset time intervals. In another embodiment, program 200 may begin in response to record processing program 130 requesting data.

Program 200 identifies characteristics of data to generate (step 202). In some embodiments, program 200 identifies preset characteristics based on user identified criteria. For example, a user of program 200 sets parameters of data to generate (e.g., numbers larger than 0 and less than 100). In some examples, a user may store preset rules in a database that program 200 can access prior to generating data. In various embodiments, program 200 identifies specific sequences, keys, record sizes, etc., of data to generate. In an example, program 200 identifies that program 200 is required to generate 150 records of various sizes in a specific order (e.g., by record size, number, etc.).

Program 200 generates a piece of data (step 204). In various embodiments, program 200 generates one or more pieces of data. In an example, program 200 generates a record containing a key, a sequence number, and extra data. In this example, the extra data is not significant but rather used to create different record or file sizes for each piece of generated data. Having sequence numbers and different file sizes, program 200 can test record processing program 130 to determine if record processing program 130 is functioning properly.

In some embodiments, program 200 may generate a piece of data and then advance to step 206. In other embodiments, program 200 may generate multiple pieces of data (e.g., a preset amount or size) before advancing to step 206. In yet other embodiments, program 200 may generate all the pieces of data indicated in the preset rules of step 202 before advancing to step 206.

In various embodiments, the generated pieces of data will include keys. In an example, key fields may be contiguous at the front of the generated record or scattered throughout the record, depending on the preset information from step 202. In some embodiments, the generated pieces of data may include unique sequence numbers that identify the order the record was generated. The sequence number allows program 200 to determine if the record processing program correctly processed the information because program 200 can determine if the sequence number is received. In some embodiments, the generated data may include a checksum of the key and record content that can determine if data has been lost or added after the generated data is received from record processing program 130. In another embodiment, the generated data may not have a checksum but rather another verification method known by a person skilled in the art.

Program 200 sends the generated piece of data to a record processing program (step 206). In some embodiments, program 200 sends each piece of generated data individually to a record processing program (e.g., record processing program 130). In an example, program 200 is sending data to record processing program 130 (a sorting program), and program 200 sends a singular piece of data as the piece of data is generated to record processing program. In one embodiment, program 200 does not store any data but rather sends the generated data to record processing program 130 as soon as the data has been generated. In other embodiments, program 200 may send the generated data to a record processing program in bulk. In an example, program 200 generates one thousand records and sends the generated records in bulk to record processing program 130 as a single transaction. In yet another embodiment, program 200 may wait until all the required data has been generated before sending the data to a record processing program (e.g., record processing program 130).

In various embodiments, program 200 sends data to a record processing program (e.g., record processing program 130) but does not store the generated data or a copy of the generated data on computing device 102. Program 200 may generate a database, such as record seen database 140, which is not a complete record of generated data in step 206 or a copy of the record of generating data in step 206 but rather a single bit that has been created for each record that has been generated. The generated bits correspond to the generated records where an ON bit indicates that a specific record should appear during validation and an OFF bit indicates that a specific record should not appear during validation.

Program 200 determines whether to generate another piece of data (decision 208). In some embodiments, program 200 may have multiple pieces of data to generate (e.g., a queue of data to generate). Program 200 may generate the data one record at a time and send the generated record directly to the record processing program (e.g., record processing program 130). When program 200 sends a piece of data to the record processing program, program 200 determines if more pieces of data to generate exist.

If program 200 determines that more pieces of data to generate exist (yes branch, decision 208), then program 200 returns to step 202. In an example, program 200 determines that only five of ten pieces of data have been generated and returns to step 202 to identify the characteristics of data to generate.

If program 200 determines that no more pieces of data to generate exist (no branch, decision 208), then program 200 waits to receive the sent data from the record processing program (step 210). In some embodiments, program 200 may receive all the previously sent data from step 206 at once. For example, record processing program 130 is a filtering program and requires all the data to be sent from program 200 before record processing program 130 can begin processing. In this example, record processing program 130 may then send all of the filtered data back to program 200 at once. In another embodiment, program 200 may receive data from a record processing program (e.g., record processing program 130) one piece of data at a time or staggered in intervals. In an example, record processing program 130 may be a sorting program and may receive all data necessary for a particular portion of the data to be sorted and then send that portion of the data back to program 200 for verification.

Program 200 determines if the data is correct and stores related bits based upon the determination (step 212). In some embodiments, when a piece of data is received from a record processing program (e.g., record processing program 130) by program 200, program 200 checks that the record is in order by verifying that the key is greater than the previous record key if sorting applies. In an example, if the key is not greater than the previous key, program 200 may flag the record to signify an error, create and error message, etc. In some embodiments, program 200 may also verify the checksum value to determine that the record's contents have not been changed. In an example, program 200 determines that a checksum does not match; and therefore, the record contents have changed, and program 200 may flag the record signifying an error, create and error message, etc. In various embodiments, program 200 turns on a bit in the previously created record seen block (e.g., record seen database 140) for each record received based upon the records sequence number. In an example, program 200 receives a record with the sequence number 100, and program 200 turns on the bit in record seen database 140 that corresponds to sequence number 100. In an example in which program 200 receives a second record with sequence number 100, program 200 determines that an error exists because the bit has already been turned on.

In various embodiments, program 200 can determine if the results are correctly returned by a record processing program by identifying if the record has been previously seen or not seen. Program 200 may utilize a list of bits that should be turned on based upon the record processing program, and if a bit in the list of bit is turned off, then program 200 can determine that an error has occurred at that record. Likewise, if program 200 tries to turn on a bit that has already been turned on, then program 200 can determine that an error has occurred because program 200 has already received that record.

In some embodiments, program 200 waits until all the data is received. In these embodiments, program 200 determines if the received data includes any errors. In an example, record processing program 130 is a sorting program, and program 200 can compare the bits generated with the data in step 206 in the record seen database with the corresponding bits in the record seen database after the data has been received. For example, program 200 can scan for a contiguous set of on bits based on the number of input records.

In some embodiments, program 200 may verify that specific bits have not been turned on indicating that a piece of data was not received from the record processing program. In an example, program 200 sends multiple records for filtering by record processing program 130. If record processing program 130 is functioning properly, then a specific record should be filtered out of the data and not sent back to program 200. Program 200 can review the bit for the record that should have been filtered out and determine whether the record was received by verifying the corresponding bit, which may be turned off (i.e., the record was not received), turned on (i.e., the record was received), or an error exists (the record was received more than once).

Figure 3:
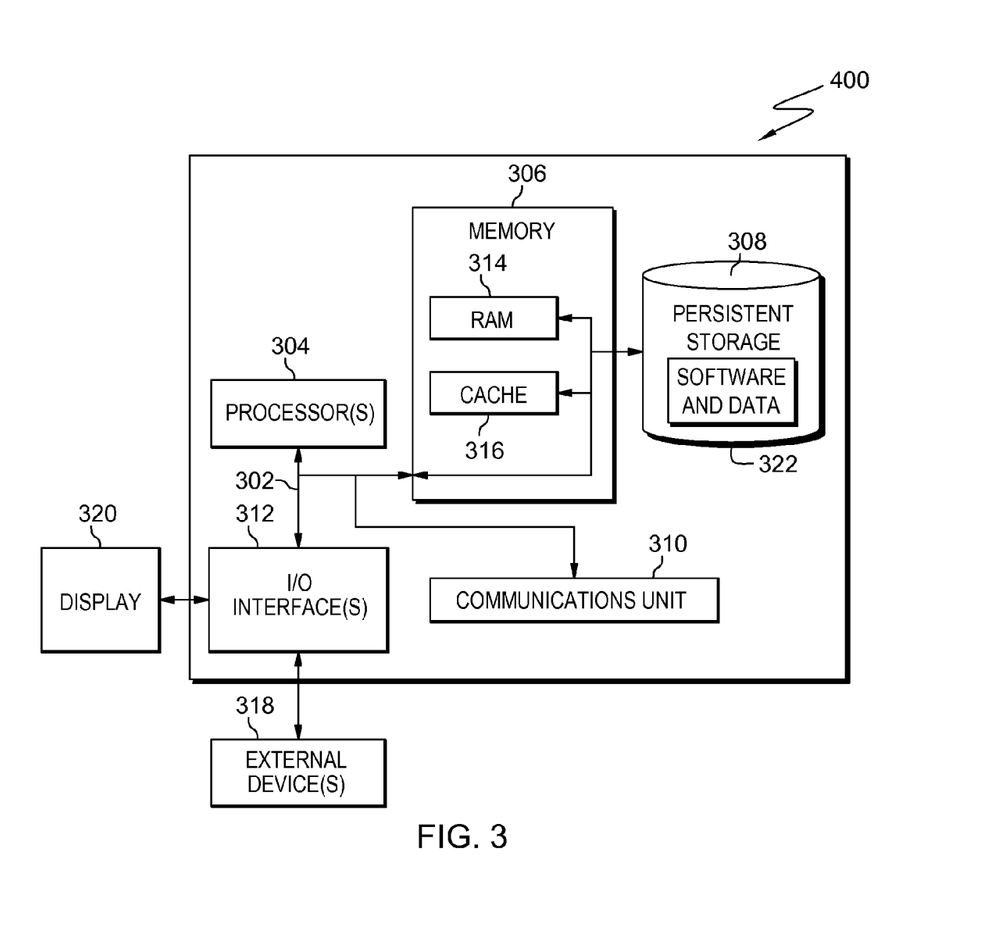
FIG. 3 depicts a block diagram of components of a client device, a server, and a source server of FIG. 1, in accordance with an embodiment of the present invention.

FIG. 3 depicts a block diagram of components of computer 300, which is representative of computing device 102, in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Computer 300 includes communications fabric 302, which provides communications between computer processor(s) 304, memory 306, persistent storage 308, communications unit 310, and input/output (I/O) interface(s) 312. Communications fabric 302 can be implemented with any architecture designed for passing data and/or control information between processors (such as microprocessors, communications, and network processors, etc.), system memory, peripheral devices, and any other hardware components within a system. For example, communications fabric 302 can be implemented with one or more buses.

Memory 306 and persistent storage 308 are computer readable storage media. In this embodiment, memory 306 includes random access memory (RAM) 314 and cache 316. In general, memory 306 can include any suitable volatile or non-volatile computer readable storage media. Software and data 322 are stored in persistent storage 308 for access and/or execution by processor(s) 304 via one or more memories of memory 306. With respect to computing device 102, software and data 322 represents verification program 120 and record seen database 140.

In this embodiment, persistent storage 308 includes a magnetic hard disk drive. Alternatively, or in addition to a magnetic hard disk drive, persistent storage 308 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of persistent storage 308.

Communications unit 310, in these examples, provides for communications with other data processing systems or devices. In these examples, communications unit 310 includes one or more network interface cards. Communications unit 310 may provide communications through the use of either or both physical and wireless communications links. Software and data 322 may be downloaded to persistent storage 308 through communications unit 310.

I/O interface(s) 312 allows for input and output of data with other devices that may be connected to computer 300. For example, I/O interface(s) 312 may provide a connection to external device(s) 318, such as a keyboard, a keypad, a touch screen, and/or some other suitable input device. External device(s) 318 can also include portable computer readable storage media, such as, for example, thumb drives, portable optical or magnetic disks, and memory cards. Software and data 322 can be stored on such portable computer readable storage media and can be loaded onto persistent storage 308 via I/O interface(s) 312. I/O interface(s) 312 also connect to a display 320.

Display 320 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for verifying data, the method comprising:
    generating, by one or more computer processors, a first piece of data based on a defined set of data characteristics, wherein the defined set of data characteristics include a key, a sequence number and extra data;
    generating, by one or more computer processors, a first bit, wherein the first bit corresponds to the first generated piece of data;
    sending, by one or more computer processors, the first generated piece of data to a target location, wherein the target location comprises a filtering application, a sorting application, and a record manipulation application;
    receiving, by one or more computer processors, the first generated piece of data from the target location;
    determining, by one or more computer processors, whether to validate the first generated piece of data received from the target location, wherein the determination is based at least in part on whether the first generated piece of data was received when the first generated piece of data should not have been filtered out by the filtering application;
    determining, by one or more computer processors, whether to validate the first generated piece of data received from the target location, wherein the determination is based at least in part on whether the first generated piece of data was received a second time from the filtering application;
    adjusting, by one or more computer processors, the first generated bit to reflect an error based on receiving the first generated piece of data twice from the filtering application; and
    generating, by one or more computer processors, a second piece of data based on a defined set of data characteristics;
    generating, by one or more computer processors, a second bit, wherein the second bit corresponds to the second generated piece of data;
    sending, by one or more computer processors, the second generated piece of data to a target location;
    receiving, by one or more computer processors, the second generated piece of data from the target location;
    determining, by one or more computer processors, whether to validate the second generated piece of data received from the target location; and
    adjusting, by one or more computer processors, the second generated bit based on the determination of whether to validate the second generated piece of data.

2. The method of claim 1, wherein the defined set of data characteristics are based on intended tests for functions of the target location.

3. The method of claim 1, wherein generating the first bit comprises:
    identifying, by one or more computer processors, verification parameters including at least one of: a sequence number for the first piece of data and a record checksum for the first piece of data;
    generating, by one or more computer processors, the first bit; and
    storing, by one or more computer processors, the generated first bit in a database based on a sequence of generated bits corresponding to the first generated piece of data and the identified verification parameters.

4. The method of claim 1, wherein determining whether to validate the second generated piece of data received from the target location comprises:
  identifying, by one or more computer processors, the second generated piece of data was received before the first generated piece of data was received from the target location; and
  determining, by one or more computer processors, that the second generated piece of data is not valid based on being received out of sequence.

5. The method of claim 1, further comprising:
  creating, by one or more computer processors, a database to store the first bit that corresponds to the first generated piece of data.

6. The method of claim 1, wherein determining whether to validate the first generated piece of data received from the target location comprises:
  identifying, by one or more computer processors, verification parameters that comprise at least one of: a position in a sequence that the first generated piece of data was received from the target location as compared to one or more other generated pieces of data and whether a valid checksum was received from the target location for the generated first piece of data; and
  determining, by one or more computer processors, whether to validate the first generated piece of data received from the target location based upon the identified verification parameters.

7. A computer program product for verifying data, the computer program product comprising:
  one or more computer readable storage media and program instructions stored on the one or more computer readable storage media, the program instructions comprising:
  program instructions to generate a first piece of data based on a defined set of data characteristics, wherein the defined set of data characteristics include a key, a sequence number and extra data;
  program instructions to generate a first bit, wherein the first bit corresponds to the first generated piece of data;
  program instructions to send the first generated piece of data to a target location, wherein the target location comprises a filtering application, a sorting application, and a record manipulation application;
  program instructions to receive the first generated piece of data from the target location;
  program instructions to determine whether to validate the first generated piece of data received from the target location, wherein the determination is based at least in part on whether the first generated piece of data was received when the first generated piece of data should not have been filtered out by the filtering application;
  determining, by one or more computer processors, whether to validate the first generated piece of data received from the target location, wherein the determination is based at least in part on whether the first generated piece of data was received a second time from the filtering application; and
  program instructions to adjust the first generated bit to reflect an error based on receiving the first generated piece of data twice from the filtering application; and
  program instructions to generate a second piece of data based on a defined set of data characteristics;
  program instructions to generate a second bit, wherein the second bit corresponds to the second generated piece of data;
  program instructions to send the second generated piece of data to a target location;
  program instructions to receive the second generated piece of data from the target location;
  program instructions to determine whether to validate the second generated piece of data received from the target location; and
  program instructions to adjust the second generated bit based on the determination of whether to validate the second generated piece of data.

8. The computer program product of claim 7, wherein the defined set of data characteristics are based on intended tests for functions of the target location.

9. The computer program product of claim 7, wherein generating the first bit comprises program instructions to:
  identify verification parameters including at least one of: a sequence number for the first piece of data and a record checksum for the first piece of data;
  generate the first bit; and
  store the generated first bit in a database based on a sequence of generated bits corresponding to the first generated piece of data and the identified verification parameters.

10. The computer program product of claim 7, wherein determining whether to validate the second generated piece of data received from the target location comprises program instructions to:
  identify the second generated piece of data was received before the first generated piece of data was received from the target location; and
  determine that the second generated piece of data is not valid based on being received out of sequence.

11. The computer program product of claim 7, wherein determining whether to validate the first generated piece of data received from the target location comprises program instructions to:
  identify verification parameters that comprise at least one of: a position in a sequence that the first generated piece of data was received from the target location as compared to one or more other generated pieces of data and whether a valid checksum was received from the target location for the generated first piece of data; and
  determine whether to validate the first generated piece of data received from the target location based upon the identified verification parameters.

12. A computer system for verifying data, the computer system comprising:
  one or more computer processors;
  one or more computer readable storage media;
  program instructions stored on the computer readable storage media for execution by at least one of the one or more computer processors, the program instructions comprising:
  program instructions to generate a first piece of data based on a defined set of data characteristics, wherein the defined set of data characteristics include a key, a sequence number and extra data;
  program instructions to generate a first bit, wherein the first bit corresponds to the first generated piece of data;
  program instructions to send the first generated piece of data to a target location, wherein the target location comprises a filtering application, a sorting application, and a record manipulation application;
  program instructions to receive the first generated piece of data from the target location;
  program instructions to determine whether to validate the first generated piece of data received from the target location, wherein the determination is based at least in part on whether the first generated piece of data was received when the first generated piece of data should not have been filtered out by the filtering application;

determining, by one or more computer processors, whether to validate the first generated piece of data received from the target location, wherein the determination is based at least in part on whether the first generated piece of data was received a second time from the filtering application; and program instructions to adjust the first generated bit to reflect an error based on receiving the first generated piece of data twice from the filtering application; and program instructions to generate a second piece of data based on a defined set of data characteristics;

program instructions to generate a second bit, wherein the second bit corresponds to the second generated piece of data;

program instructions to send the second generated piece of data to a target location;

program instructions to receive the second generated piece of data from the target location;

program instructions to determine whether to validate the second generated piece of data received from the target location; and program instructions to adjust the second generated bit based on the determination of whether to validate the second generated piece of data.

13. The computer system of claim 12, wherein the defined set of data characteristics are based on intended tests for functions of the target location.

14. The computer system of claim 12, wherein generating the first bit comprises program instructions to:

identify verification parameters including at least one of: a sequence number for the first piece of data and a record checksum for the first piece of data;

generate the first bit; and store the generated first bit in a database based on a sequence of generated bits corresponding to the first generated piece of data and the identified verification parameters.

15. The computer system of claim 12, wherein determining whether to validate the second generated piece of data received from the target location comprises program instructions to:

identify the second generated piece of data was received before the first generated piece of data was received from the target location; and determine that the second generated piece of data is not valid based on being received out of sequence.

16. The computer system product of claim 12, wherein determining whether to validate the first generated piece of data received from the target location comprises program instructions to:

identify verification parameters that comprise at least one of: a position in a sequence that the first generated piece of data was received from the target location as compared to one or more other generated pieces of data and whether a valid checksum was received from the target location for the generated first piece of data; and determine whether to validate the first generated piece of data received from the target location based upon the identified verification parameters.

* * * * *